Aug. 7, 1962  B. KALTENEGGER  3,048,089
LAND ROLLER FOR ROLLING ROAD SURFACES AND THE LIKE
Filed Aug. 18, 1959  2 Sheets-Sheet 1
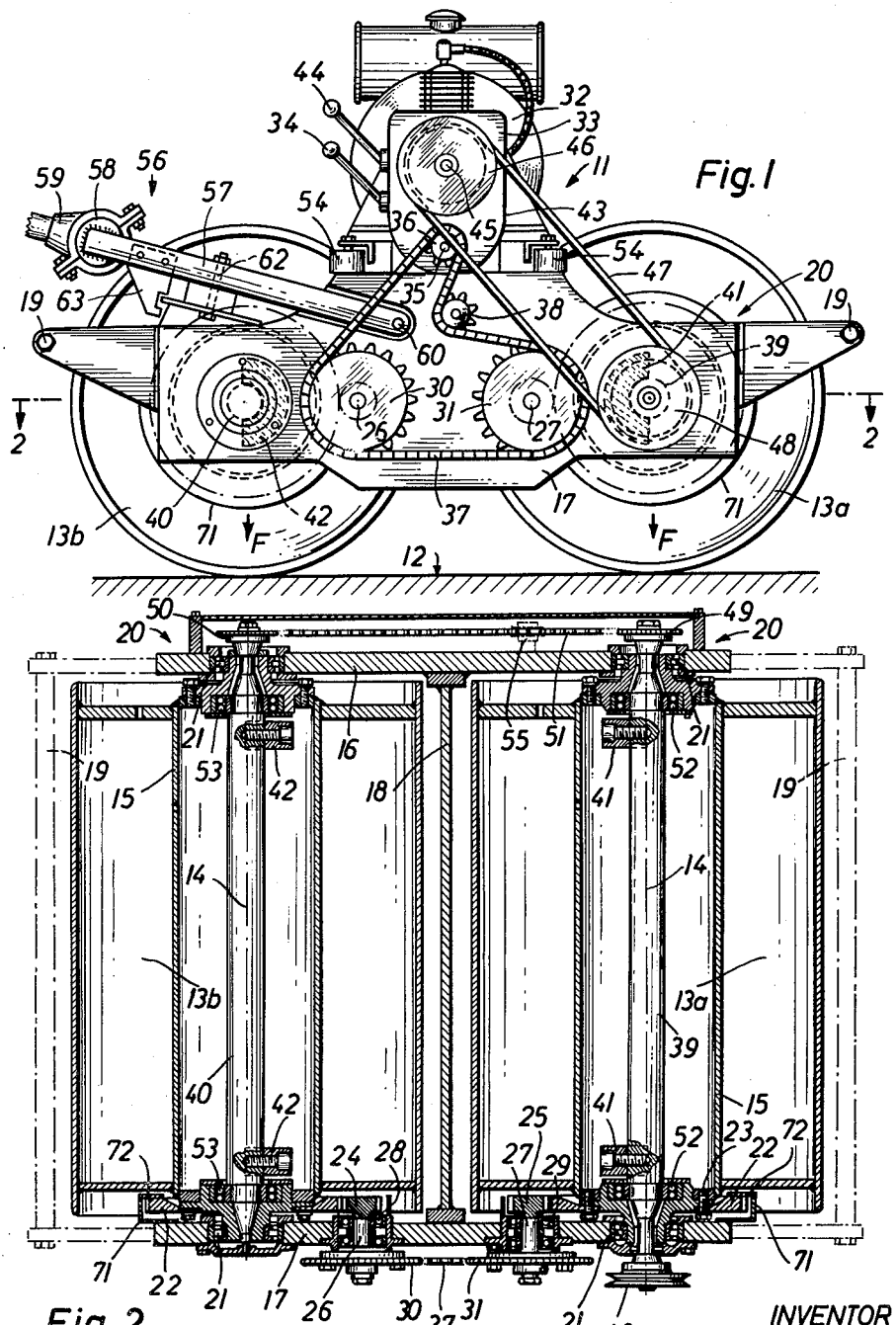
INVENTOR
B. Kaltenegger
BY Lowry & Rinehart
ATTYS.

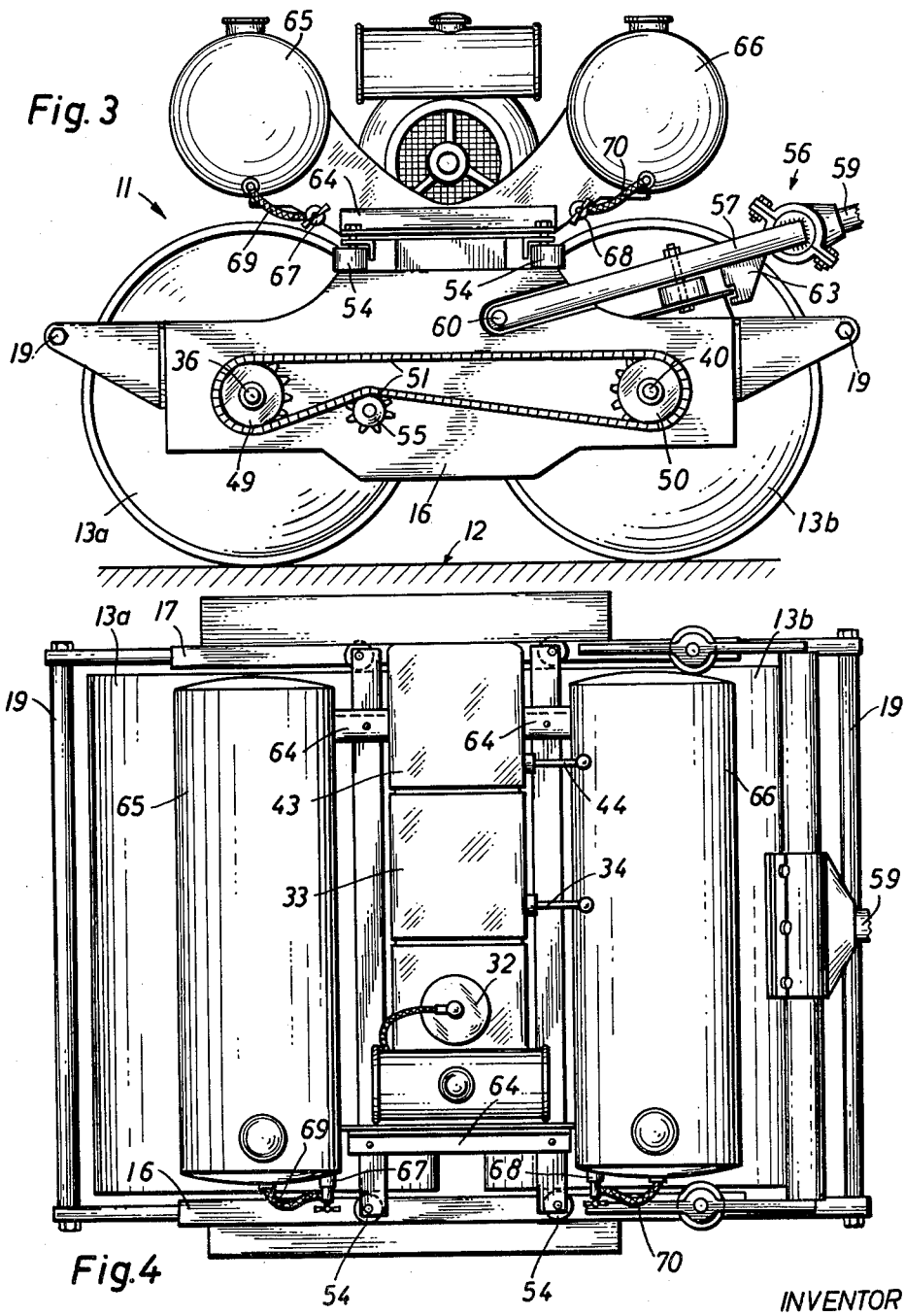

United States Patent Office 3,048,089
Patented Aug. 7, 1962

3,048,089
LAND ROLLER FOR ROLLING ROAD SURFACES AND THE LIKE
Benno Kaltenegger, Siegburg-Buisdorf, Germany, assignor to Bomag Bopparder Maschinenbau-gesellschaft m.b.H., Boppard, Germany, a firm
Filed Aug. 18, 1959, Ser. No. 834,469
Claims priority, application Germany Sept. 12, 1958
5 Claims. (Cl. 94—50)

This invention relates to a land roller having a weight-loaded one-part or multi-part roller for compacting or rolling road surface courses, aggregate and similar bases.

In prior machines of this character, the one-part or multi-part roller is subjected to a constant weight load, the trunnions of the roller rotating in bearings of a box-type frame filled with water, pearl white or the like and fixed to the chassis of the machine.

The invention has for its purpose to obtain an essentially higher efficiency of the machine by means of a periodical variation of the total load of the roller dependent on the traveling speed of the machine. According to the invention, two weight-loaded rollers with parallel axes are arranged one behind another in the traveling direction of the device and for each roller is provided a driven eccentric shaft mounted concentrically to its axis. Preferably, the eccentric weights of the one shaft are offset for 180° in the perpendicular sectional plane of the shaft from the eccentric weights of the other shaft. Advantageously, the two eccentric shafts may be rotated in the same direction with equal angular velocity by a common drive independent from the drive for the rollers.

The weight load for the rollers is equally distributed by the bearing frame to the two rollers. Upon rotation of the driven eccentric shafts, the horizontally directed eccentric forces continually compensate one another and there remain effective only the vertical components of these forces. The eccentrics of the two shafts rotating in the same direction produce vertical components of the forces which become effective as moments of rotation to the bearings of the two shafts. If the eccentric shaft of the one roller produces an upwardly directed vertical force, the vertical force produced by the eccentric shaft of the other roller is directed downwardly. If the maximal values of the vertical eccentric forces are designated by $+F$ and $-F$, the total load of each roller varies in a sinusoidal manner between the maximum values of $\frac{1}{2}L+F$ and $\frac{1}{2}L-F$. The load curves of the two rollers are offset from one another for a half rotation of the driven eccentric shafts.

In this manner it becomes possible to increase the pressure to be exerted by the rollers to the surface during the rotation thereof, whereby a higher compression of the surface to be rolled may be obtained. In spite of the periodical variation of the total load of the rollers, the machine runs very quietly and works without undue vibrations.

One embodiment of the invention is illustrated by way of example in the drawings, in which:

FIG. 1 shows a side elevation of the machine according to the invention, namely, the driving side with the protection cover removed;

FIG. 2 is a horizontal cross-section on the line 2—2 of FIG. 1;

FIG. 3 is a view of the side of the machine opposite to the driving side, the device being additionally provided with a removable water container; and FIG. 4 shows a top view of the machine as illustrated in FIG. 3.

The machine 11 for compacting a road surface course or aggregate base 12 has two rollers 13a and 13b with parallel axes 14 arranged one behind another in the traveling direction of the machine 11. The trunnions 15 of the two rollers 13a and 13b are formed hollow and are journaled on each side in a frame part 16 and 17. The frame parts 16, 17 are connected in the middle and at the ends by stiffening braces 18, 19 to a closed frame. The frame consisting of the parts 16, 17, 18, 19 simultaneously forms the chassis 20 of the device.

The hollow trunnions 15 and thereby the rollers 13a and 13b are journaled in the frame parts 16, 17 by means of bearings 21, preferably roller bearings. The rollers are driven by gear wheels 22 which are fixed to the trunnions by bolts 23. The gear wheels 22 are engaged by pinions 24, 25 whose pivots 26—27 are journaled in the frame parts 16, 17 by means of the bearings 28, 29. The ends of the pivots 26, 27 bear chain wheels 30, 31. The engine 32 as, for instance, a gasoline engine, is provided with a gear 33 for forward and reverse motion. This gear 33 has a switching bar 34 and its ouput shaft 35 bears a chain wheel 36 whose chain 37 runs over the two chain wheels 30, 31 so that the two rollers are driven simultaneously. A further wheel 38 is provided for tightening the chain 37.

In the hollow trunnion 15 of each of the rollers 13a, 13b is journaled a shaft 39 or 40 which is coaxial to axis 14. Each shaft is provided with one or more eccentric weights 41 and 42 which are distributed along the shaft. As shown in FIGS. 1 and 2 of the drawing, the eccentric 41 of shaft 39 belonging to roller 13a is offset for 180° in a perpendicular plane to the eccentric 42 of the other shaft 40 in the roller 13b. The eccentric weights 41, 42 are segments extending over a semicircle. A separate engine may be provided for driving the eccentric shafts 39, 40. In the illustrated embodiments, the drive is derived from engine 32 by means of an intermediate gear 43. This gear has a switching bar 44 and its ouput shaft 45 bears a driving pulley 46 which is connected by means of a V-belt 47 with another pulley 48 fixed to the shaft 39. The two shafts 39 and 40 are connected with one another by means of a chain 51 running over chain wheels 49, 50 and a slack take-up wheel 55 so that the two shafts 39, 40 are driven in the same direction. The shafts 39, 40 are journaled in the trunnions 15 by means of ball bearings 52 and 53.

The load of the chassis and the weights supported thereby are equally distributed to the rollers 13a and 13b. In the forward or reverse motion of the device, the horizontal components of the forces exerted by the eccentric weights 41 and 42 rotating in the same direction continually compensate one another. There remain effective only the vertical components F of the eccentric forces. The engine 32 with the gear boxes 33, 43 is supported by chassis 20 in known manner, as, for instance, by means of rubber buffers 54. The gear wheels 22, 24 and 25 may be protected in known manner by a cover 71. This cover may be closed rearwardly of gear wheels 22 by annular discs 72 connected with or welded to the gear wheels and extend close to the angular part of the protecting cover 71 so that also from the inner side, no dirt may enter into the gear wheels.

A steering device 56 serves for steering the roller according to the invention. The device 56 consists of two steering arms 57 which are connected by means of a tube 58. A hand lever 59 is fixed to the tube 58 which allows adjustment of the lever in a more or less inclined position. During transport of the roller, the hand lever 59 may be shifted towards the engine 32. The steering arms 57 are pivotally mounted at 60 at the chassis 20 or at the frame parts 16, 17 and rest upon rubber buffers fixed by means of bolts 62. The upward movement of the steering device is limited by means of a clamp 63.

A removable water container is provided for wetting the rollers with water. A further frame 64 is mounted upon the chassis 20 or upon the frame supporting the driving aggregate 32, 33, 43. With this frame 64 are connected two water containers 65 and 66 which extend parallel to the roller axes and enclose the driving aggregate. The unit formed by the frame 64 and the water containers 65, 66 may be mounted or removed at will. The containers respectively have tubes 67 and 68 extending parallel to the roller axis and provided with nozzles. The tubes 67, 68 are respectively connected with the containers by outside conduits 69 and 70 with intermediate valves.

The illustrated embodiment shows a roller formed as a self-propelled unit. But the device may also be constructed as a trailer to be moved by a tractor or the like. In this case, the drive of the eccentric shafts may also be derived from the engine of the tractor.

While there is herein shown and described the preferred embodiment of the invention, it is nevertheless to be understood that minor changes may be made therein without departing from the spirit and scope of the invention as claimed.

What is claimed is:

1. In a vehicular compaction device, a support frame, a pair of ground-engaging rollers journaled in tandem relation on parallel axes of rotation on said frame, each roller including vibration creating means reacting in out-of-phase relation with respect to each other on the axis of rotation of the respective rollers to alternately cause a downward thrust on the rollers urging them toward a support surface, said vibration means comprising a shaft journaled on said support frame in said rollers on the axis of rotation of said rollers, each of said shafts including weight means thereon in radially disposed eccentric relation with respect to the axis of rotation of said shafts for alternate vertical vibration of said rollers, said weight means being oriented on said shafts in 180° out-of-phase relation with respect to each other with both of said weight means being vertical relative to their centers of rotation at the same time, first drive means on said support frame and drivingly connected to said rollers for rotating the same in a common direction at the same angular velocity, and second drive means drivingly connected to said shafts for rotating the same independently of said first drive means and at a common angular velocity and in the same direction.

2. The structure of claim 1; said weight means comprising semi-circular elements concentric to said shafts.

3. The structure of claim 1; and a power source on said support frame, said power source including a transmission connected to said first and second drive means, said first and second drive means comprising a positive mechanical drive.

4. The structure of claim 3; said positive mechanical drive including gear sprockets and chains entrained thereover.

5. The structure of claim 1; said rollers comprising hollow cylindrical members having a hollow cylindrical, tubular shaft extending axially therethrough and concentric to the axis of rotation of said rollers and terminally journaled in opposite sides of said support frame, said shafts extending axially through said tubular shaft on the axis of rotation of said rollers and terminally journalled on said frame, said weight means being disposed within said tubular shaft.

References Cited in the file of this patent

UNITED STATES PATENTS

| | | |
|---|---|---|
| 1,270,725 | Gratton | June 25, 1918 |
| 1,722,907 | Liddle | July 30, 1929 |
| 2,025,703 | Baily | Dec. 31, 1935 |
| 2,133,862 | Kerns | Oct. 18, 1938 |
| 2,248,478 | Mall | July 8, 1941 |
| 2,633,781 | Day | Apr. 7, 1953 |
| 2,671,386 | Kerridge | Mar. 9, 1954 |
| 2,677,995 | Wood | May 11, 1954 |
| 2,828,676 | Steuerman | Apr. 1, 1958 |

FOREIGN PATENTS

| | | |
|---|---|---|
| 354,558 | Great Britain | Aug. 13, 1931 |